United States Patent [19]

Fujii et al.

[11] 4,408,867

[45] Oct. 11, 1983

[54] OPTICAL SCANNING UNIT DRIVING DEVICE FOR ELECTROPHOTOGRAPHIC REPRODUCING APPARATUS

[75] Inventors: Yozo Fujii, Hachioji; Takao Shiozawa, Akigawa, both of Japan

[73] Assignee: Konishiroku Photo Industry Co., Ltd., Tokyo, Japan

[21] Appl. No.: 351,937

[22] Filed: Feb. 24, 1982

[30] Foreign Application Priority Data

Mar. 12, 1981 [JP] Japan .................................. 56-34649

[51] Int. Cl.³ ............................................ G03G 15/00
[52] U.S. Cl. ...................................... 355/8; 355/3 R; 355/14 R; 355/55; 355/56
[58] Field of Search .............. 355/8, 3 R, 14 R, 14 E, 355/55, 56, 57

[56] References Cited

U.S. PATENT DOCUMENTS

| | | | |
|---|---|---|---|
| 4,315,683 | 2/1982 | Schmaling et al. | 355/8 |
| 4,319,835 | 3/1982 | Navone | 355/8 X |
| 4,335,953 | 6/1982 | Tsuchiya et al. | 355/57 X |
| 4,338,022 | 7/1982 | Farago | 355/57 X |
| 4,344,696 | 8/1982 | Murata et al. | 355/8 X |
| 4,348,106 | 9/1982 | Suzuki et al. | 355/8 X |
| 4,372,671 | 2/1983 | Berdinner, Jr. | 355/14 R X |

*Primary Examiner*—A. C. Prescott
*Attorney, Agent, or Firm*—James E. Nilles

[57] ABSTRACT

A driving device for optical scanning unit of electrophotographic reproducing apparatus wherein a variable speed transmission of the driving mechanism of the optical scanning unit is installed on the outside of the drive mechanism mounting panel so that the desired speed ratio can be obtained by replacing the minimum amount of parts required.

2 Claims, 4 Drawing Figures

OPTICAL SCANNING UNIT DRIVING DEVICE FOR ELECTROPHOTOGRAPHIC REPRODUCING APPARATUS

BACKGROUND OF THE INVENTION

1. Field of the Invention:

This invention relates to a driving device for the optical scanning unit of electrophotographic reproducing apparatus.

2. Description of the Prior Art:

The electrophotographic reproducing apparatus has two types of exposing a material to be copied: in one type the copy board is moved and in other type the optical scanning unit is moved. The optical scanning unit consists of a document illuminating lamp, a group of mirrors and a focusing lens, all arranged under the copy board installed on the upper portion of the reproducing apparatus. Either the copy board of the optical scanning unit is made to reciprocate in synchronism with the copying operation. In the electrophotographic reproducing apparatus whose magnifying ratio can be changed the scanning speed of the optical scanning unit is varied in accordance with the magnifying ratio. In the conventional copying machine, the driving speed of the scanning unit is changed by changing the engagement of gears from one gear to other gear with different number of teeth.

In such variable speed driving equipment which makes use of engagement of gears, the distance between the shafts of two gears in mesh is constant, so that it is difficult to obtain a desired combination of gears to change the speed ratio. To obtain the desired gear ratio, it is necessary to use a complicated speed change mchanism with more than two stages of gear trains or to change the distance between gear shafts. To change the distance between the gear shafts it is necessary to replace the frame supporting the gear shafts and this will make the mechanism complex. When it is desired to change the speed ratio, with the driving mechanism assembled into the electrophotographic reproducing apparatus, it is necessary to remove the frame to replace the gears.

Thus, the conventional practice is to prepare the optical scanning unit driving device for each different speed ratio and, when changing the speed ratio, replace the whole device. This method is relatively simple in replacement work since the whole unit is replaced, but has disadvantages that since each unit contains frame, shaft and clutches the unit is heavy and expensive.

SUMMARY OF THE INVENTION

To obtain the desired speed ratio by simply changing the parts concerned without replacing the whole one device, the variable speed transmission of the driving mechanism of the optical scanning unit is installed on the outside of the drive mechanism mounting panel so that the desired speed ratio can be obtained by replacing the minimum amount of parts required.

Other objects and features of this invention will become apparent in the course of explanation of embodiments of this invention referring to the accompanying drawings.

DESCRIPTION OF THE PREFERRED EMBODIMENTS

Figure 1:
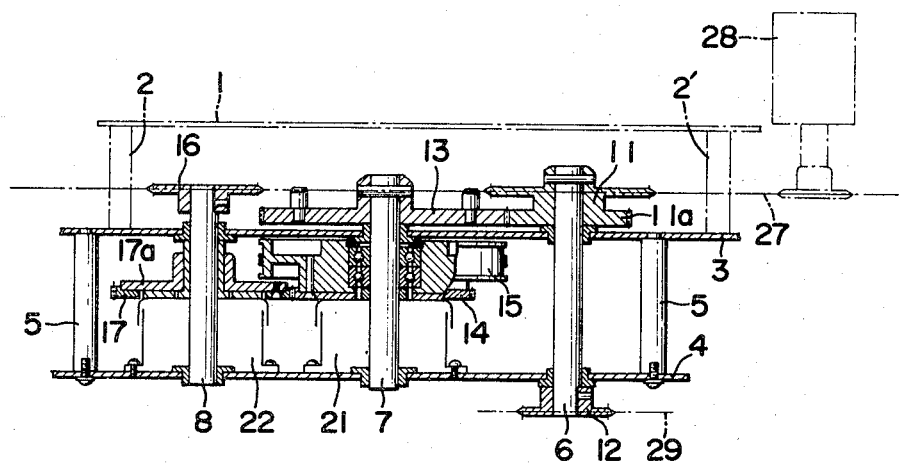
FIG. 1 is a cross-sectional view taken along the line A—A of FIG. 3 showing the drive mechanism of optical scanning unit of this invention.
Figure 2:
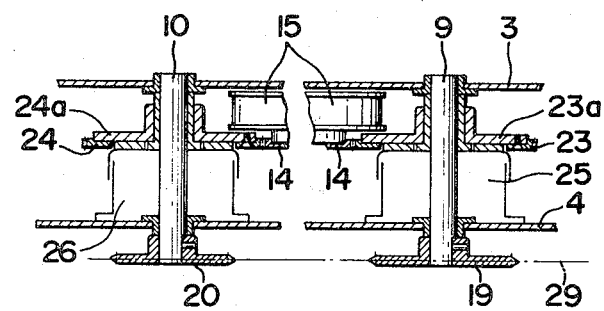
FIG. 2 is a cross-sectional view taken along the line B—B of FIG. 3.
Figure 3:
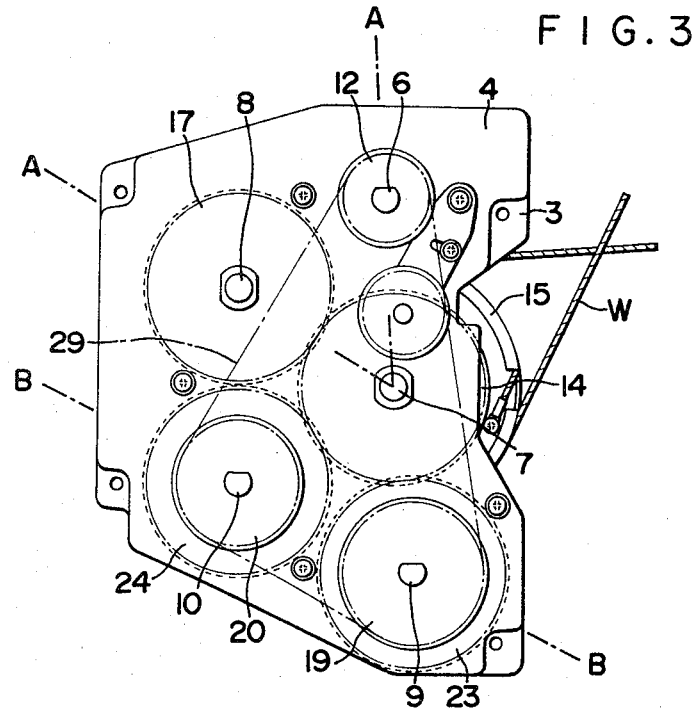
FIG. 3 is a side view showing the drive mechanism of optical unit of this invention.
Figure 4:
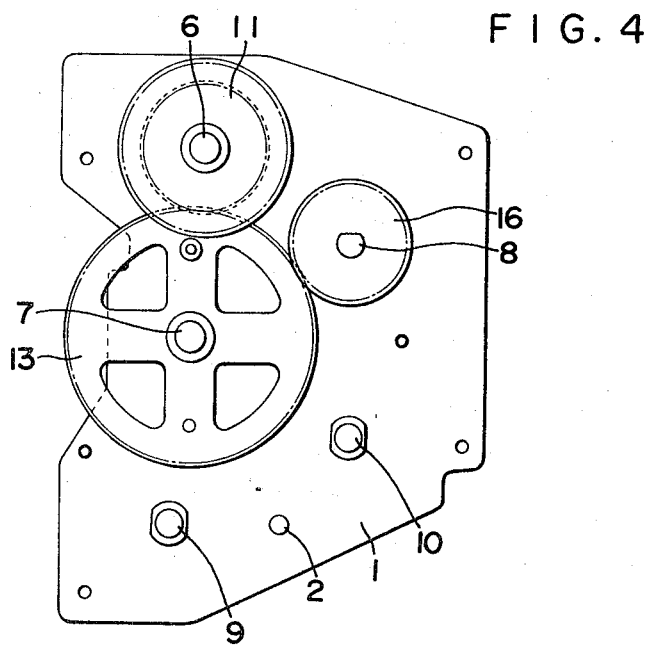
FIG. 4 is another side view showing the drive mechanism of optical unit of this invention.

A side plate 3 is mounted to the electrophotographic reproducing apparatus body panel 1 by stays 2, 2'. Parallel to the side plate 3 another side plate 4 is mounted by a plurality of stays 5. Rotatably supported on the side plates 3, 4 are shafts 6, 7, 8, 9 and 10; the shaft 6 has a gear 11a and a sprocket 11—integral with each other—and another sprocket 12 all rigidly secured thereto; the shaft 7 has a gear 13 in mesh with the gear 11a; the shaft 8 has a sprocket 16; the shaft 9 has a sprocket 19; and the shaft 10 has a sprocket 20 rigidly secured thereto. The shaft 7 also has a pulley 15 rotatably supported thereon which is rigidly secured to the gear 14 by screws. Assembled between the shaft 7 and the pulley 15 is an electromagnetic clutch 21 which when energized causes the shaft 7 and the pulley 15 to rotate together. A mirror driving wire W (see FIG. 3) is wound around the pulley 15. When the electromagnetic clutch 21 is energized and the pulley 15 and the shaft 7 rotate together, the mirror (not shown) constituting the optical scanning unit is driven at the same speed as the photosensitive drum. The shaft 8 has, in addition to the sprocket 16, a gear 17 with a flange 17a rotatably supported thereon. An electromagnetic clutch 22 is assembled between the shaft 8 and the gear 17 so that when energized the electromagnetic clutch 22 causes the shaft 8 and the gear 17 to rotate together. The gear 17 is in mesh withthe gear 14 securely mounted on the shaft 7. Thus, energizing only the electromagnetic clutch 22 causes the pulley 15 to be driven by the shaft 8.

The shafts 9, 10 have sprockets 19, 20 and gears 23, 24 with flanges 23a, 24a, each rotatably mounted thereon, with electromagnetic clutches 25, 26 assembled between the shafts 9, 10 and the gears 23, 24. When energized, each electromagnetic clutch causes the shafts and the gear to rotate together. The gears 23, 24 are in mesh with the gear 14. The sprockets 11, 16 are driven by the main motor 28 through a chain 27, and the sprockets 12, 19, 20 are interconnected by a single chain 29. The above is the construction of the driving device of this invention.

Now, we will explain the operation of the driving device. When the copy button is pressed, the main motor 28 starts rotating, driving the sprockets 11 and 16 through the chain 27 and therefore rotating the shafts 6 and 8. The shaft 7 is rotated because of the engagement between the gear 11a of the sprocket 11 and the gear 13. The shafts 9, 10 are driven by the sprocket 12 through the chain 29 and the sprockets 19, 20. Now all the shafts are rotating. Then, at the time of starting the scan on the material to be copied, when for example the electromagnetic clutch 21 is energized, the pulley 15 will rotate together with the shaft 7, as described earlier, causing the mirror, through the wire W, to start scanning at the speed ratio of 1 for the 1:1 magnification. When for example the electromagnetic clutch 26 is energized, the pulley 15 will drive the mirror at the following speed ratio with respect to the shaft 7:

$$\frac{\text{Number of teeth of gear 13}}{\text{Number of teeth of gear 11a of sprocket 11}} \times$$

$$\frac{\text{Number of teeth of sprocket 12}}{\text{Number of teeth of sprocket 20}} \times \frac{\text{Number of teeth of gear 24}}{\text{Number of teeth of gear 14}}$$

When the electromagnetic clutch 25 is energized, the mirror is driven at the relevant speed ratio. The electromagnetic clutch 22 is used to return the mirror and not directly associated with this invention, so the explanation on the clutch is omitted (refer to the Japanese Patent Laid-Open No. 91231/1979).

With the above driving device mounted to the electrophotographic reproducing apparatus, the sprockets 12, 20, 19 and the speed ratio changing chain 29 are all arranged on the outside of the side plate 4, so that they can easily be removed and replaced with the sprockets with different number of teeth.

If we assume $$\frac{\text{Number of teeth of gear 13}}{\text{Number of teeth of gear 11a}} \times \frac{\text{No. of teeth of gear 24(23)}}{\text{No. of teeth of gear 14}} = 2$$

and also assume the number of teeth ratio of the sprocket 12 to the sprocket 20(19) to be 17:28, then the mirror speed will be about 1/0.82 times that of the shaft 7;
17:24, then it will be about 1/0.71 that of the shaft 7;
17:26, then it will be about 1/0.76 that of the shaft 7;
17:22, then it will be about 1/0.65 that of the shaft 7.

These are the most commonly used speed ratios for the copying machines as can be seen from the table below.

| Domestic and Europe | | United States | |
|---|---|---|---|
| B4 → A4 | } ...0.82 | 11" × 17" → 8½" × 14" | ...0.76 |
| B5 → A5 | | | |
| A3 → A4 | } ...0.71 | 11" × 17" → 8½" × 11" | ...0.65 |
| B4 → B5 | | | |
| A4 → A5 | | | |

As explained in the above, since in this invention the variable speed transmission of the driving mechanism of the optical scanning unit is installed on the outside of the driving mechanism mounting panel, the procedure for changing the magnifying ratio can greatly be simplified and the copying can be done in wide range of magnifying ratios, thus improving the performance and efficiency of the copying machine.

What is claimed is:

1. A driving device for optical scanning unit of electrophotographic reproducing apparatus comprising: a driving source; a plurality of gear means, each driven at different speed by the driving source; a first power transmission means to transmit the driving force to the optical scanning unit; and a second power transmission means which, in synchronism with the magnifying ratio selection operation, transmits the rotation of the specified gear means of the multiple gear means to the first power transmission means; whereby the specified gear means is mounted to the member easily accessible from outside of the electrophotographic reproducing apparatus.

2. A driving device as set forth in claim 1, wherein the gear means are sprockets.

* * * * *